United States Patent [19]

Vijeh et al.

[11] Patent Number: 5,353,353
[45] Date of Patent: Oct. 4, 1994

[54] REPEATER SECURITY SYSTEM

[75] Inventors: Nader Vijeh, Sunnyvale; William Lo, Santa Clara, both of Calif.

[73] Assignee: Advanced Micro Devices, Inc., Sunnyvale, Calif.

[21] Appl. No.: 53,797

[22] Filed: Apr. 26, 1993

[51] Int. Cl.$^5$ .............................. H04K 1/00
[52] U.S. Cl. .......................... 380/29; 380/49; 380/3; 380/4; 370/85.1
[58] Field of Search ................. 380/3, 29, 4, 49; 340/825.07, 825.52; 364/242.95; 370/85

[56] References Cited

U.S. PATENT DOCUMENTS

| | | | |
|---|---|---|---|
| 4,680,755 | 7/1987 | Reames | 370/85 |
| 5,099,517 | 3/1992 | Gupta et al. | 380/29 |
| 5,161,192 | 11/1992 | Carter et al. | 380/49 |
| 5,177,788 | 1/1993 | Schanning et al. | 380/49 |

*Primary Examiner*—David C. Cain
*Attorney, Agent, or Firm*—Benman, Collins & Sawyer

[57] ABSTRACT

A system is provided for use in a network providing security to ensure the prevention of unauthorized receipt of data. The system utilizes a jamming sequence to prevent unauthorized ports from receiving certain data. Repeaters utilized in the network are provided with the capability to detect a particular data sequence to provide the improved features.

6 Claims, 6 Drawing Sheets

REPEATER SECURITY SYSTEM

FIELD OF THE INVENTION

The present invention relates generally to secure communication within a local area network and more particularly to disrupting data that is received by ports of a repeater in such a network.

BACKGROUND OF THE INVENTION

In traditional Ethernet (802.3 10BASE5) and Cheapernet (802.3 10BASE2) a coaxial cable provides the linear bus to which all nodes are connected. Signalling is accomplished using a current synch technique with a center conductor used for the signal and a shield used as a ground reference. Twisted pair Ethernet (802.3 10BASE-T) utilizes standard voice grade telephone cable, employing separate transmit and receive pairs. The system uses a star topology. At the center of a star is a repeater. The repeater performs signal amplitude and timing restoration. It takes the incoming bitstream and repeats it to all the ports connected to it. In this sense the repeater acts as a logical coaxial cable so that any node connected to the network will see another node's transmission. Differential signalling is employed with one pair acting as the transmit path and the other pair acting as the receive path.

While repeaters are used in traditionally wired coaxial Ethernet as a means to extend the networks physical distance limit, in the IEEE 802.3 10BASE-T, the standard mandates the use of a repeater to actually provide the connectivity function if more than two nodes are required. Although the physical signalling on the cabling differs, the functionality of the repeater is identical in either coaxial or twisted pair networks as is the frame or packet format that is used to pass messages between the participating nodes on the network.

The frame commences with a preamble sequence which is an alternating (1,0) pattern. The preamble provides a single frequency on the network, in this case 5 (MHz) at the start of each frame, which allows a receiver to lock to the incoming bitstream. This preamble sequence is then followed by a start of packet which indicates that the data portion of the message will follow. Either a start of frame delimiter (802.3) or synch sequence (Ethernet) is used to delineate the start of the data portion of the message. The next two fields are the destination address (DA) and the source address (SA) for the frame. Both are 48 bit values which are transmitted least significant bit (LSB) first.

The destination address is used by the receiving media access controller (MAC) to determine if the incoming packet is addressed to this particular node. If the receiving node detects a match between its own node address and the address within the DA field, it will attempt to receive the packet. Other nodes which did not detect a match will ignore the remainder of the packet.

Three types of destination addressing are supported by these standards.

1. Individual. The DA field contains an individual and unique address assigned to one node on the network.

2. Multicast. If the first bit of the DA field is set this indicates that the group address is being used. The group of nodes that will be addressed is determined by a higher layer function but in general the intent is to transmit a message between logically similar subset of nodes on the network.

3. Broadcast. The broadcast is a special form of multicast address where the DA field is set to all 1s. The address is reserved, and all nodes on the network must be capable of receiving a broadcast message.

The source address field is supplied by the transmitting media access controller (MAC), which inserts it own address into this field as the frame is transmitted indicating it was the originating station. The receiving MAC is not required to take action based on the SA field. The 2-byte length or type field follows the SA field. The choice of length or type is dependent upon whether the frame is compatible with the IEEE 802.3 Ethernet standard. The high order byte of the length type field is transmitted first with the LSB of each byte transmitted first. The data field contains the actual packet data that is being transferred and is between 46 to 1500 bytes in length.

A Logical Link Control (LLC) function is responsible for fragmenting data into block sizes suitable for transmission over the network. Data bytes are transmitted sequentially with the LSB of each byte transmitted first. Finally, the frame check sequence (FCS) is a four-byte field that contains the cyclic redundancy check (CRC) for the entire frame. The CRC is computed by the transmitting station on the destination address, source address, length/type, and data field and appended as the last four bytes of the frame. The same CRC algorithm is used by the receiving station to compute the CRC value for the frame as it is received.

The value computed at the receiver is compared with that appended by the transmit station providing an error detection mechanism in the case of corrupted data. The CRC bits within the FCS are transmitted in the order most significant bit to least significant bit. Referring now to FIGS. 1 and 2, what is shown is the frame format for an IEEE 802.3 Standard compliant frame and an Ethernet frame, respectively. The primary difference as can be seen from the figures is that the start of frame delimiter (SFD) for 802.3 is defined as a byte that has a "1,0, 1,0, 1,0, 1,1" pattern whereas the start frame (synch) of Ethernet is a "1,1" sequence. However, it is seen in both cases the preamble plus the start of frame indication is a total of 64 bits long.

802.3 and Ethernet standards both specify that a packet must be in the range of 64-1518 bytes. However, the actual data field in the 802.3 system is permitted to be smaller than the 46 byte value that is necessary to ensure this minimum size. This is handled by requiring the media access control layer to append pad characters to the LLC data field before sending data over the network. The Ethernet standard assumes that the upper layer ensures that the minimum data field is 46 bytes before passing data to the MAC and the existence of these appended characters is unknown to the MAC. The 802.3 standard also uses a length field which indicates the number of data bytes that are on the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network.

Hence, it has been found that it is important to be able to provide security in such networks for a variety of reasons, more particularly for repeaters in such networks it is important to prevent ports of such repeaters from receiving certain data while other ports may be able to receive such information. For example, authentication may be required to ensure that the appropriate nodes on the network receive the information.

Typically, repeaters have been devices that are just used for signal amplitude and timing restoration. In all of the above-mentioned modes the repeater must also be provided with the capability to detect and interpret data and fields within it.

The present invention addresses the need for this type of device.

SUMMARY OF THE INVENTION

The present invention utilizes a circuit to provide for secure transmission over a network that has multiple ports.

In a first aspect of the invention, receive security or eavesdropping protection is provided by monitoring the destination field upon receiving a message from a port, the destination address field is obtained and compared against the station address that is currently connected to each of the remaining ports of the repeater. The system produces a disrupt mask dependent upon whether the security features are enabled for the port whether there is a destination address/source address match, and whether the packet is a multicast/broadcast. This mask pattern is provided to the repeater, and used to selectively pass the message unmodified or disrupt the message depending upon the pattern.

This system has the advantage that the disrupt mask is actually provided over one serial line rather than over a plurality of serial lines. This disrupt feature can be enabled or disabled on a port by port basis, and it allows for the address comparison and disrupt decision to be made independently on each repeater module since data that passes between modules over the inter-module expansion bus, is unmodified.

The present invention comprises means for enabling the disrupt function, a plurality of disrupt circuits coupled to the use enabling means, there being one disrupt circuit for each port in the multiport repeater, and each of the disrupt circuit means being coupled in a serial fashion. A detect circuit is coupled in between the first and last disrupt circuits to detect a start bit in a bitstream. The circuit further includes means for providing a jam sequence responsive to a particular bit of data that will block the data stream from reaching the port.

DETAILED DESCRIPTION OF THE INVENTION

The present invention is directed toward a system for providing secure communications in a LAN network that utilizes multiport repeaters. The following description is presented to enable one of ordinary skill in the art to make and use the invention and is provided in the context of a patent application and its requirements. Various modifications to the preferred embodiment will be readily apparent to those skilled in the art and the generic principles and features described herein.

In copending, U.S. Patent application Ser. No. 08/019,926 entitled, Address Tracking Over Repeater Based Networks, assigned to assignee of the present application a system for tracking the address application over a network. The present invention is directed to an aspect of this system and has significant utility therewithin. Accordingly, the above identified patent application is incorporated by reference herein. However, it should be understood that the present invention would be useful within a variety of systems and should not be limited to the above identified disclosed system.

The system, as described in the above identified patent application, allows the source address of an incoming packet to be monitored and compared with an internally stored value. The internal value is either programmed by the user through a microprocessor interface or by simply learning and storing the source address of the previous packet. The present invention takes to advantage that the last source address indicates the source address of the last packet received on the port. If the source address changes, this indicates the sending station connected to the port either changed or that multiple nodes are connected to that port.

A counter can be maintained to indicate the number of times that the source address has changed on the port. Hence, there will be an increment to one after power up assuming that the source address does not match a previously stored or expected value. For a multi-drop segment, the source address may change many times as different stations transmit over the network. Hence, this counter can be used to provide an indication of which type of network medium or configuration this port is likely to be connected to, or whether the source address field has changed even though this was not expected.

For example, the source address could have changed because someone is trying to gain unauthorized access to the network. Consequently, the present invention provides an interrupt that informs the host processor that the source address on the port has changed. The host can then, dependent upon the port type, or other decision making criteria available to it, choose to allow the port to continue to operate or alternatively disable the port from further participation in the network.

Figure 1:
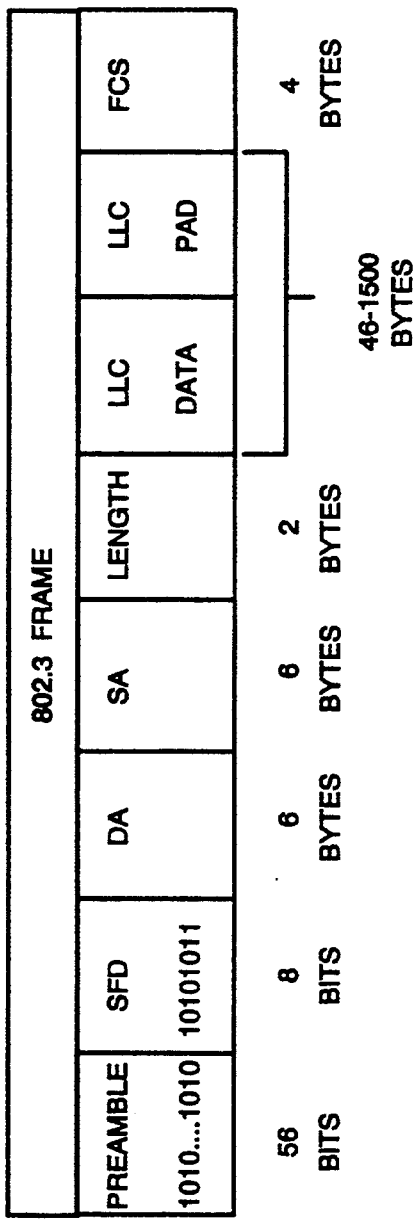
FIG. 1 is a block diagram of the format for an 802.3 frame.
Figure 2:
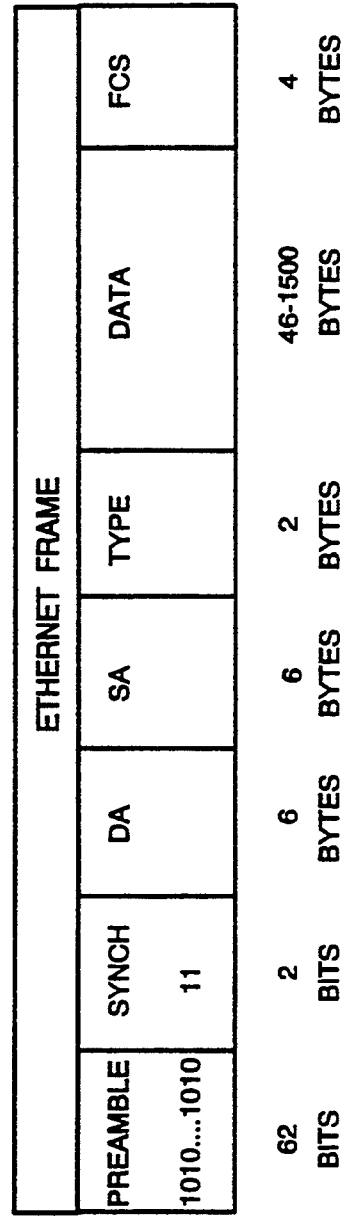
FIG. 2 is a block diagram of the frame format for an Ethernet frame.
Figure 3:
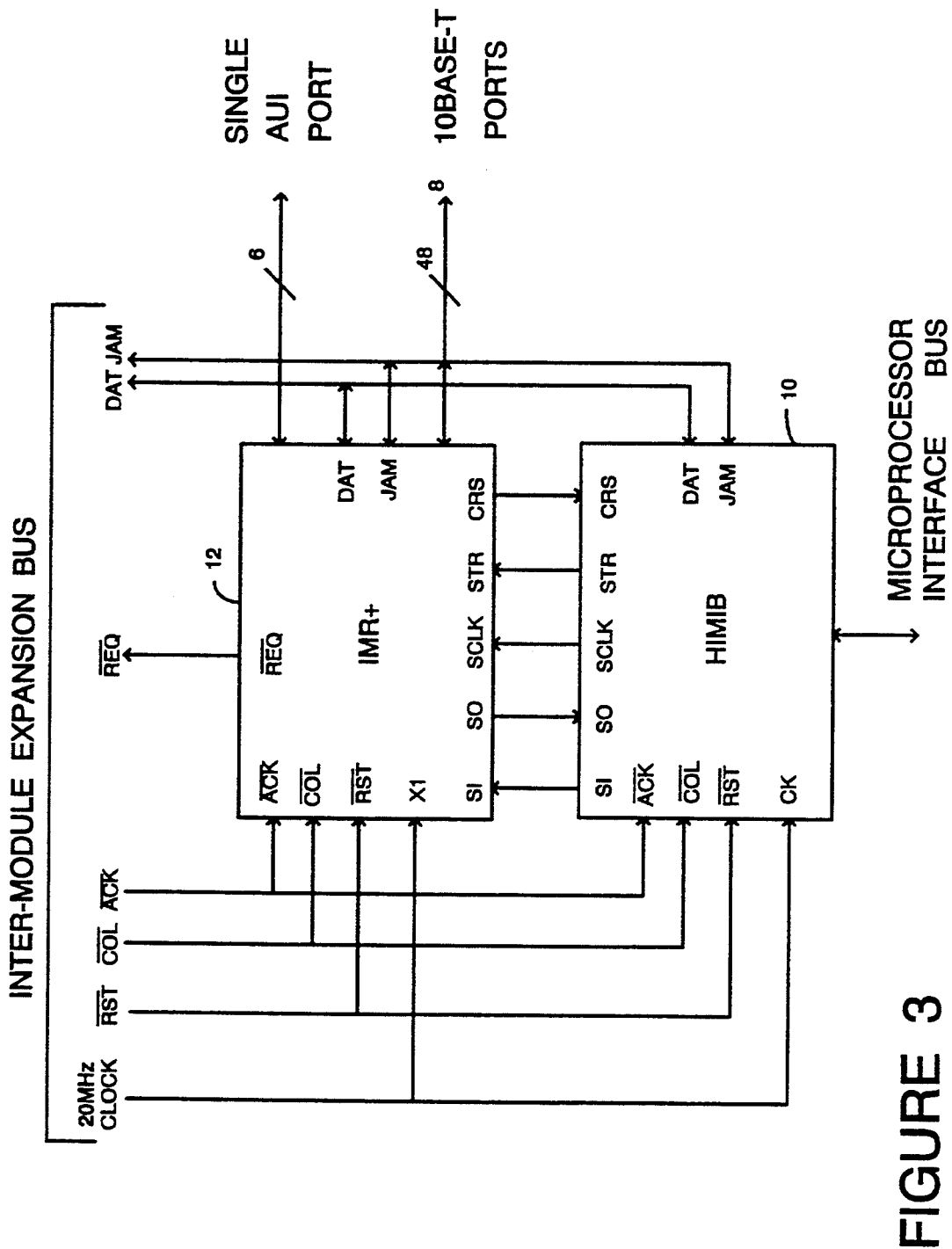
FIG. 3 is a simplified block diagram of an Integrated Multiport Repeater and a Hardware Implemented Management Information Base Device in accordance with the present invention.

Referring now to FIG. 3, there are two devices that are utilized to provide protection against unauthorized access in a preferred embodiment. One is entitled The Hardware Implemented Management Information Base (HIMIB) Device 10 and the other is an Integrated Multiport Repeater (IMR) device 12. The IMR device 12 provides the basic repeater function, performing signal amplitude and timing restoration, incorporating 8 individual 10BASE-T ports, and one Attachment Unit Interface (AUI) port. The AUI port allows connection of the 10BASE-T ports to an existing coaxial wired Ethernet/Cheapernet network. The IMR device 12 also provides an inter-module expansion bus, which allows multiple IMR devices 12 to be cascaded together, and still be treated as a single repeater. In addition, the IMR device 12 also has a management port, to allow configuration and monitoring of the operational state of the repeater, and a simple reporting function to provide an external indication of which port is receiving at any time.

The HIMIB device 10 is a companion device to the IMR device 12, and provides monitoring for all network activity detected by the IMR device. The HIMIB device collects statistics based on the type of network activity, and stores this information internally as registers which can be accessed by an external host device, such as a microprocessor. The host typically uses the data collected and stored by the HIMIB device to provide network management information, in order to more easily administer the operation and/or fault diagnosis of the network.

HIMIB 10

Storage of Source Address

Figure 4:
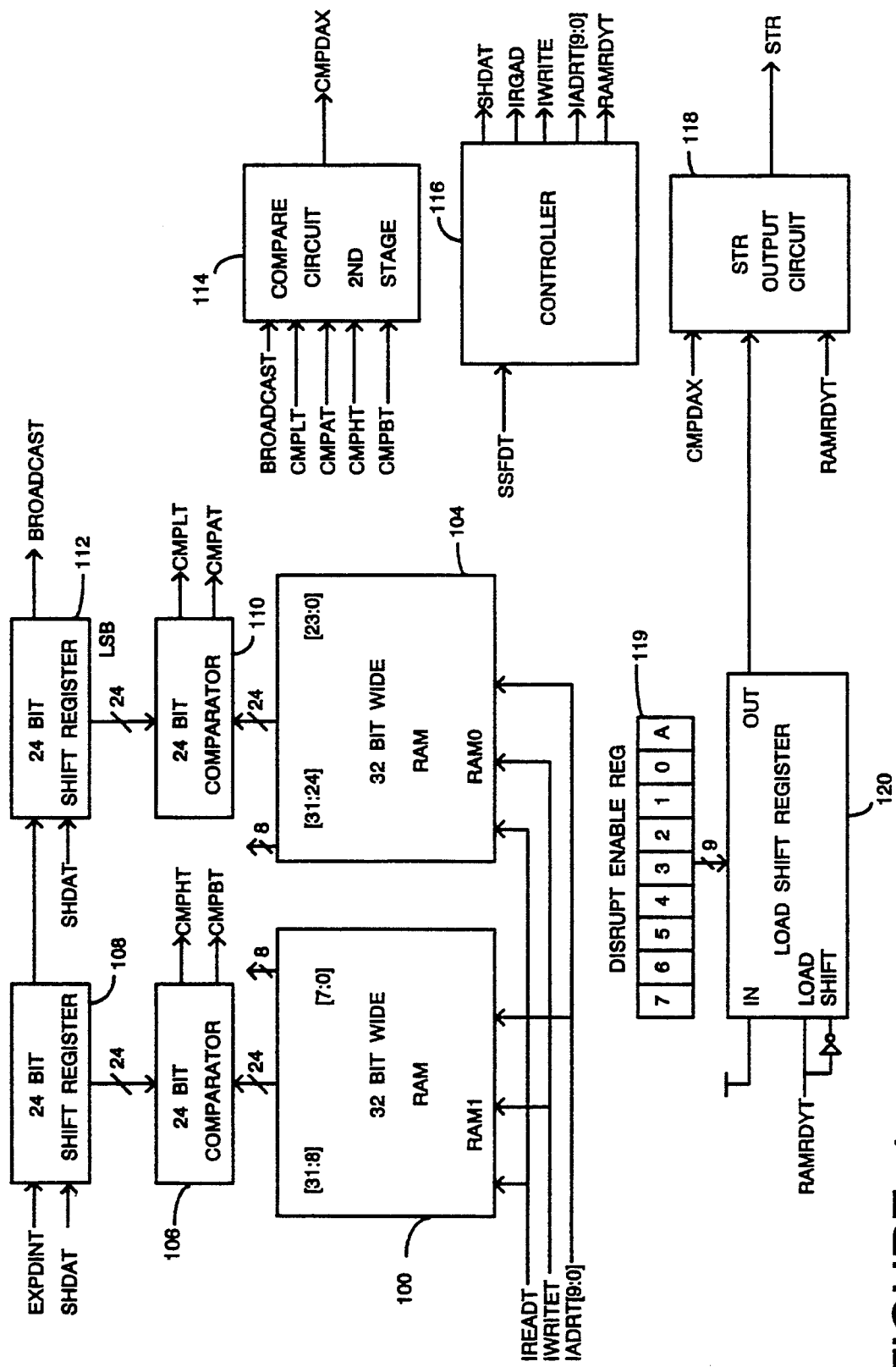
FIG. 4 is a destination address compare circuit.

FIG. 4 is a block diagram of destination address DA compare circuit in the HIMIB device 10. The circuit 10 comprises random access memories (RAM) 102 and 104, which are coupled to comparators 106 and 110 respectively. In this embodiment the RAMs 102 and 104 are 32 bit wide memories and the comparators 106 and 110 are 24 bit wide comparators. The comparators 106 and 110 in turn are coupled to shift registers 108 and 112 respectively. These shift registers 108 and 112 in this embodiment are 24 bit shift registers. The sizes of the various devices are arbitrary and one of ordinary skill in the art will recognize that many other combinations could be used and still be within the spirit and scope of the present invention.

The output from circuits 106 and 110 are provided to a second stage compare circuit 114. A controller 116 is also included which receives input signals and provides a plurality of outputs to the various portions of circuit 10. The controller 116 also provides signals to a shift register 121 which in combination with signals from the second stage compare circuit 114 and the controller 116 controls strobe STR output circuit 118.

The 32 bit wide RAMs 102 and 104 hold the values of the managed repeater attributes. With the exception of the Source Address attribute (SA) each RAM location holds one attribute. Since the SA for each port is 48 bits wide, the SA is split into two RAM locations—the lower 24 bits of the SA is stored in the lower 24 bits in RAM 104, the upper 24 bits of the SA is stored in the upper 24 bits in RAM 102. The upper 8 bits of RAM 104 and the lower 8 bits of RAM 102 holding the SAs are not used. The reason that the SA is stored across two RAMs is that the full 48 bits can be accessed at the same time.

The values written into the SA locations are either written in through the microprocessor interface (MPI) by the user, or automatically updated when a valid frame is received. In the latter case, the source address of the frame is written into the corresponding SA location for the specific repeater port in the RAM.

Enabling the Disrupt Function

The disrupt function must be enabled explicitly for each port (that is a port will not be disrupted even if the port SA does not match the packet DA with the disrupt function disabled). Upon reset, the HIMIB sets the Disrupt Enable Register to disable for all ports. Each port can be enabled individually by writing the appropriate commands via the MPI.

Disrupt the Bitstream on STR Pin

The format of the disrupt bitstream is as follows:

$$\ldots HHHHLA01234567HHHHHHHHH \ldots$$
$$H = high, \; L = low, \; A = AUI, \; 0-7 = TP \; 0-7.$$

Normally, the STR pin is held high. The sequence begins with a low (start bit) followed by 9 bits indicating whether a port should be disrupted. (0=disrupt, 1=no disrupt). The IMR 12 requires 9 stop bits (high) before another disrupt command can be issued, but the HIMIB 10 issues at most one disrupt command per packet.

Normally, RAMRDYT is asserted which indicates to the 9 bit parallel load shift register 121 to load the value from the 9 bit Disrupt Enable Register 119. Once the SA versus DA comparison begins, RAMRDYT is de-asserted and the 9 bit shift register stops loading and starts shifting out the disrupt enable bits (AUI, TP 0 . . . TP 7). The shifting of the 9 bit shift register coincides with the bitstream of CMPDAX from the compare circuit.

When RAMRDYT transitions from asserted to deasserted, the STR output circuit outputs a start bit (low) on the STR pin. During the next 9 bit times if the output of the 9 bit shift register 120 indicates enable and CMPDAX from 114 indicates unequal, a disrupt bit (low) will be output on the STR pin from 118, otherwise a no-disrupt (high) will be output.

IMR 12

Enabling the Disrupt Function

The disrupt function is enabled on the IMR device 12 when the appropriate management command is sent to the IMR device 12. The management command is typically sent by the HIMIB device 10 during the initialization sequence. Within several bit times after the disrupt function is enabled, the IMR device 12 STR pin becomes an input.

Loading the Disrupt Bitstream

Figure 5:
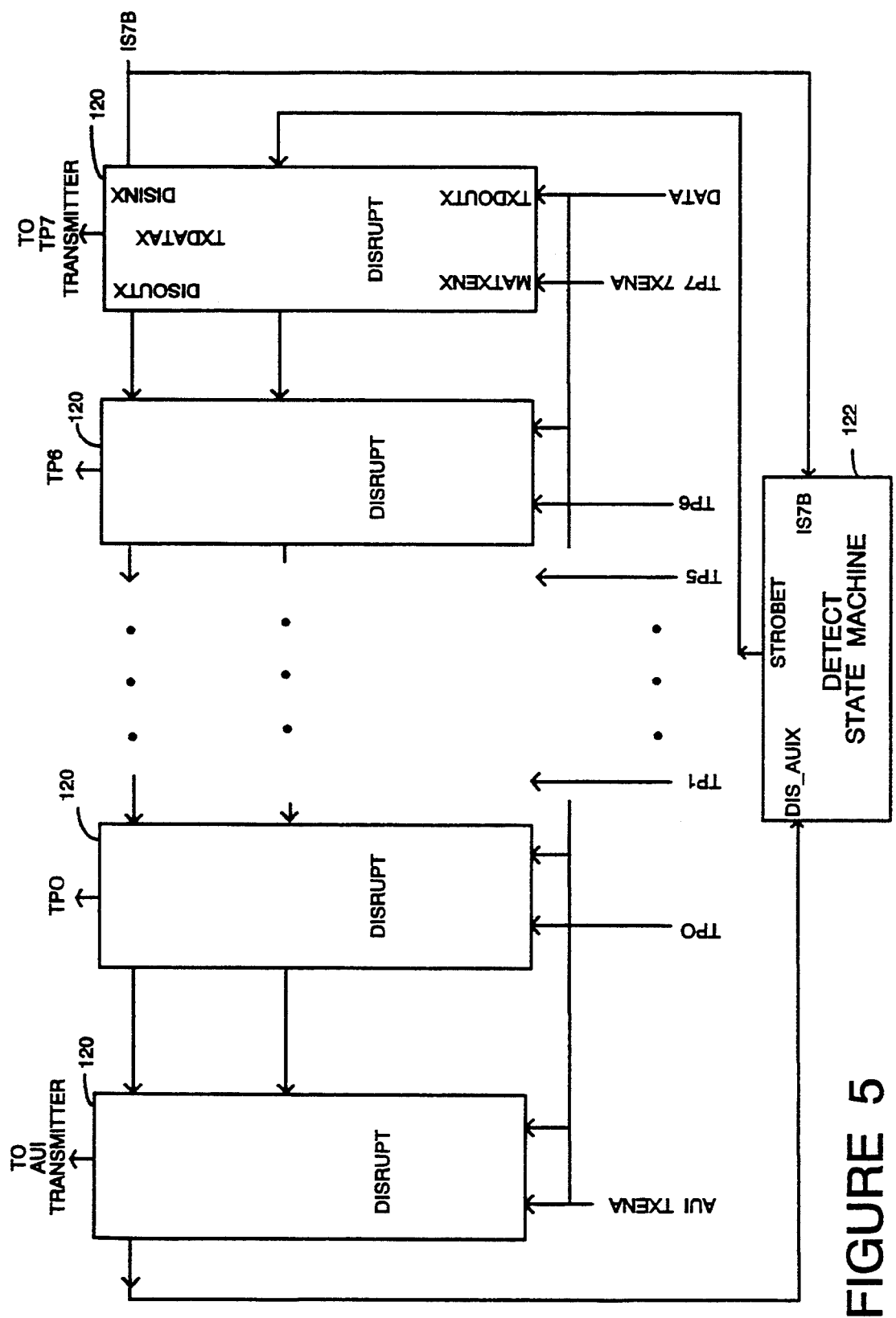
FIG. 5 is an overall block diagram of the IMR disrupt function.
Figure 6:
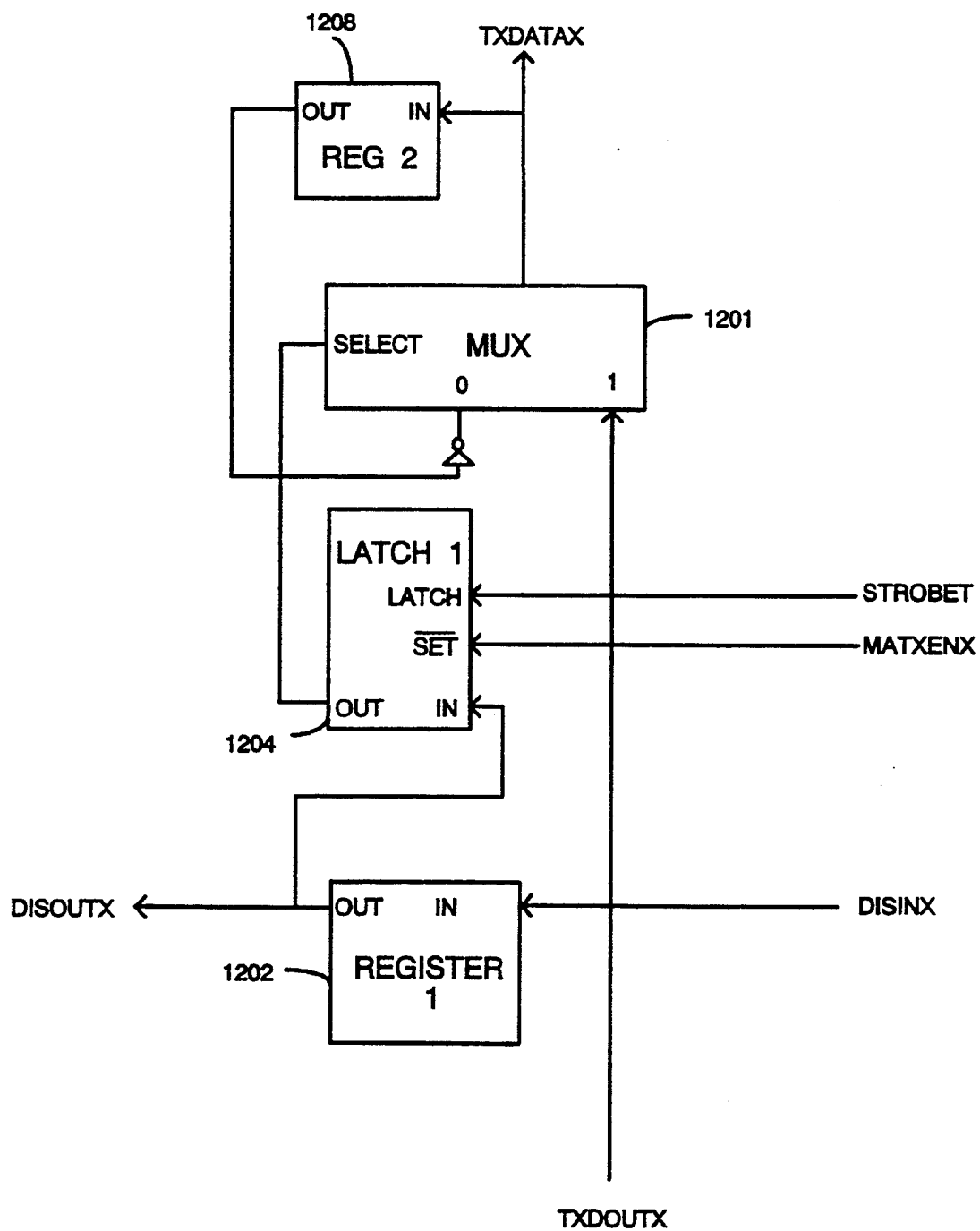
FIG. 6 is a more detailed block diagram of the IMR disrupt circuitry.

FIG. 5 is a block diagram of the IMR disrupt circuit 120. In this embodiment are nine copies of the disrupt circuit 120 which are coupled in a serial manner and there is disrupt detect state machine 122 coupled in feedback relation with the circuit 120. There is one disrupt circuit 120 for each port in the IMR. FIG. 6 is a block diagram of one disrupt circuit 120 of the IMR circuit 12 of FIG. 5.

Inside each DISRUPT circuit 120 there is a 1 bit shift register 1202 (FIG. 6). The 1 bit shift registers 1202 are chained across the DISRUPT circuits 120 to form a nine bit shift register. All bits from the STR pin (ISTB) are shifted through the 9 bit shift register. The output of the shift register is DIS_AUIX. The shift register is normally filled with 1s (since the STR pin is normally held high).

Figure 7:
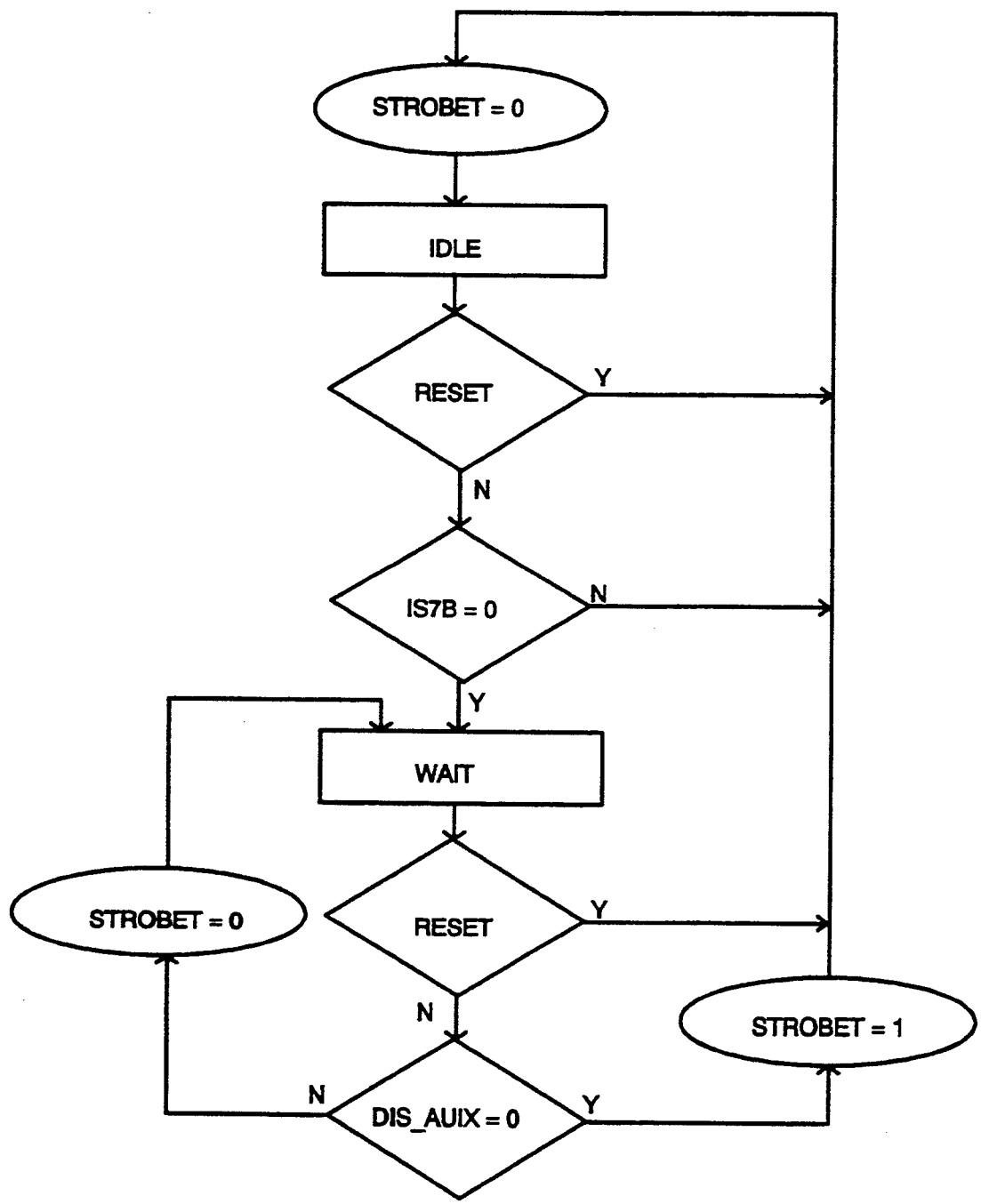
FIG. 7 is a flow chart showing the disrupt command detect state machine.

The bits from the STR pin also goes into the DETECT circuit 122, which contains a state machine which looks for the start bit (low). The operation of the state machine is shown in a flow chart in FIG. 7. Once a start bit is detected, the state machine enters a wait state and waits for the start bit to propagate through the 9 bit shift register (DIS_AUIX). Once the start bit propagates through the shift register, the state machine asserts (STROBET) for 1 bit time and exits back into the idle state.

Referring now to FIG. 6, when STROBET is asserted, the data in each of the 1 bit shift register 1202 (REG 1) in the DISRUPT circuit 120 is latched into LATCH 1204. LATCH 1204 is normally set. LATCH 1204 can only be cleared if a disrupt bit is strobed in.

Disrupting a Port

LATCH 1204 is set whenever MATXENX is de-asserted. MATXENX is asserted when the port is transmitting, otherwise it is de-asserted. When LATCH 1204 is in the set state data on TXDOUTX passes through the DISRUPT circuit 1204 via TXDATAX unaltered. When LATCH 1204 is in the clear state, data on TXDOUTX is blocked and TXDATAT will pass alternating 1s and 0s (jam sequence). Note that at the end of transmission, MATXENX will be asserted and LATCH 1204 will be set.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

We claim:

1. A system for providing security for a network that includes a plurality of ports for transmitting and receiving data, the data including a bit that indicates the start of a data stream and a bit corresponding to each port that is to receive the data the system comprising;

a plurality of disrupt circuits means coupled to the plurality of ports, there being one disrupt circuit means for each port, each of the disrupt means being coupled in a serial fashion;

a detect circuit means coupled between a first disrupt circuit means and a last disrupt circuit means to detect when the start bit has reached to last disrupt circuit means; and means for providing a jam sequence of data that will block a data bitstream from reaching a particular port responsive to the detect circuit means.

2. The system of claim 1 in which each of the disrupt circuit means includes a shift register, each of the shift registers being chained in a serial manner.

3. The system of claim 2 in which each of the disrupt circuit means includes a latch for receiving a bit of from the data bitstream which provides an indication of whether the data provided to a particular port should be disrupted.

4. The system of claim 3 in which each of the latches correspond to each of the ports.

5. The system of claim 4 in which the detect circuit means comprises;

means for detecting a start bit;

means coupled to the detecting means for determining whether the start bit has reached to one bit shift register; and means responsive to the start bit reaching the last one bit shift register for asserting a signal that latches bits from the plurality of one bit shift register to the latch to indicate whether a port should be disrupted.

6. The system of claim 5 in which the asserting means provides a strobe signal to the one bit shift registers that latches the data into the latches.

* * * * *